United States Patent [19]
Kondis

[11] 3,853,542

[45] Dec. 10, 1974

[54] PROCESS FOR PROMOTING REACTIVITY OF ALUMINUM

[75] Inventor: Thomas J. Kondis, Pittsburgh, Pa.

[73] Assignee: Aluminum Company of America, Pittsburgh, Pa.

[22] Filed: Jan. 8, 1973

[21] Appl. No.: 321,688

[52] U.S. Cl. ................................ 75/68, 260/448 A
[51] Int. Cl. ............................................. C22b 21/00
[58] Field of Search............ 260/448 A; 75/68 R, 68

[56] References Cited
UNITED STATES PATENTS

| | | | |
|---|---|---|---|
| 3,104,252 | 9/1963 | Radd et al. | 260/448 A |
| 3,382,269 | 5/1968 | Williams et al. | 260/448 A |
| 3,505,375 | 4/1970 | Gautreaux et al. | 260/448 A |
| 3,687,994 | 8/1972 | Kobetz et al. | 260/448 A |

Primary Examiner—H. Sneed
Attorney, Agent, or Firm—Abram W. Hatcher, Esq.; John P. Taylor, Esq.

[57] ABSTRACT

Use of liquid or soluble non-halide titanium, zirconium, niobium, vanadium, scandium, uranium, and hafnium-containing organic compounds in promoting reaction of particulate aluminum, for example, in alkylation.

2 Claims, No Drawings

PROCESS FOR PROMOTING REACTIVITY OF ALUMINUM

BACKGROUND OF THE INVENTION

1. Field of the Invention

This invention relates to activating particulate aluminum, especially atomized aluminum, including aluminum base alloys containing at least 50 percent by weight aluminum. More particularly, it relates to use of a new promoter for reactions of particulate aluminum such as with hydrogen and aluminum alkyls or olefins to form aluminumalkyl or alkylaluminum compounds useful as catalysts and otherwise.

2. Description of the Prior Art

U.S. Pat. No. 3,104,252 deals with use of reaction promoting amounts of aluminum base alloys containing titanium and certain other elements in reacting an alkylaluminum hydride with an olefin to form an aluminumalkyl or alkylaluminum compound. Netherlands Pat. No. 6,516,569 involves use of titanium and certain other metal halides in the same capacity.

SUMMARY OF THE INVENTION

While such reaction promoters have proved beneficial in the production of aluminumalkyls, I have found that liquid or soluble non-halid titanium, zirconium, niobium, vanadium, scandium, uranium and hafnium-containing organic compounds are more consistent or reliable in exerting a reaction-promoting effect in reactions taking place to form aluminumalkyls, especially when used during milling of particulate aluminum prior to reacting it. By liquid or soluble, I mean that the promoters must be either liquid under reaction conditions or soluble in the reaction medium. This permits intimate interaction between the promoter and the nascent aluminum surface.

The aforementioned promoters have the further advantage of eliminating undesirable residual chloride contaminants from the final product, as would be left, for example, from the use of titanium tetrachloride.

Preferred organic compounds useful according to my invention include the esters and the alcoholates, especially those of titanium and zirconium, preferably titanium, for example, tetraisopropyl titanate, titanium glycolate and zirconium octoate. These promoters are useful, for example, in activating aluminum to be used in the following reactions of aluminum.

1. $2Al + 3H_2 + 4(C_nH_{2n+1})_3Al \rightarrow 6(C_nH_{2n+1})_2AlH$
2. $6(C_nH_{2n+1})_2AlH + 6C_nH_{2n} \rightarrow 6(C_nH_{2n+1})_3Al$,
   which may be combined as the overall reaction,
3. $2Al + 3H_2 + 6C_nH_{2n} \rightarrow 2(C_nH_{2n+1})_3Al$.

It appears that, surprisingly, while the reaction promoters are of little, if any, value for foregoing Equation (2), their net effect, because of their ability in combining with metallic aluminum, is substantial in Overall Equation (3). If desired, the olefin may be reacted directly with the aluminum and hydrogen, as in Equation (3).

According to my invention, the promoter or promoters may be added in catalytic quantities, either to the milling environment, when an activated or pyrophoric milled aluminum is used, or to the autoclave or other-type reaction vessel or environment during the overall alkylation or other reaction, if or when conducted.

Alkylaluminum compounds which may be prepared by reacting aluminum activated with liquid or soluble non-halide organic compounds such as set out hereinabove include also aluminumalkyl hydrides and halides and may be represented by the formula

wherein $R_1$ is a hydrocarbon radical and $R_2$ and $R_3$ are hydrogen, halogen or a hydrocarbon radical. The aforementioned hydrocarbon radical can contain from 2 to 40 carbon atoms and can be alkyl, aryl, alkaryl or aralkyl.

The reaction promoters of my invention are suitable for activating aluminum used in preparing organoaluminum compounds such as the following:

Diethylaluminum chloride
Diethylaluminum bromide
Diisobutylaluminum chloride
Diisobutylaluminum bromide
Dioctylaluminum chloride
Dipentadecylaluminum bromide
Didocosylaluminum chloride
Diphenylaluminum hydride
Diphenylaluminum chloride
Di-para-tertiarybutylphenyl aluminum hydride
Di-para-tertiarybutylphenyl aluminum chloride
Diphenyloctylaluminum hydride
Diphenyloctylaluminum chloride
Triphenylaluminum
Tri-para-tertiarybutylphenyl aluminum
Triphenyloctylaluminum Aluminum activated according to my invention is particularly suitable for preparing organoaluminum compounds such as the following:

Diethylaluminum hydride
Diisobutylaluminum
Dioctylaluminum hydride
Dipentadecylaluminum hydride
Didocosylaluminum hydride
Ditetracontylaluminum
Triethylaluminum
Triisobutylaluminum
Trioctylaluminum
Tripentadecylaluminum
Tridocosylaluminum Representative starting alkylaluminum compounds or olefins useful in reacting with aluminum activated according to the invention correspond more or less to the organic radical portions of the above-recited compounds.

Representative of starting materials which may be reacted according to the above alkylation reaction are triethylaluminum (TEA), triisobutylaluminum (TIBA), trioctylaluminum, triphenylaluminum, tripentadecylaluminum, and tridodecylaluminum. Commercially available triethylaluminum useful as the starting TEA reacted as above to yield additional TEA may also contain some tri-n-propyl aluminum, tri-n-butylaluminum, triisobutylaluminum hydride and methane or other residual solvent. The olefin or alkene used in forming the desired aluminum alkyl, as explained hereinabove, may be reacted directly with the aluminum and hydrogen, if desired, instead of using an alkylaluminum compound at the start of the reaction.

Although smaller quantities of the non-halide promoter are useful according to the invention, I prefer to use at least 0.005 percent by weight. Larger quantities may be used, although they are not often much more effective than an 0.01 percent amount in promoting the alkylation reaction.

The particulate aluminum that may be activated in the presence of promoters such as identified hereinabove includes atomized aluminum, granulated aluminum, powdered aluminum, aluminum powder, or any other type of aluminum particles fine enough to be wet milled or ground, for example, in a ball mill. The particle size is not critical according to the invention. Preferred milling is in the presence of an inert hydrocarbon such as benzene, hexane, mineral spirits and the like. Time used when milling is employed is not critical according to the invention, although only a few seconds are required to impart the desired activity. Nor are the temperature and pressure during the milling critical, ambient temperature and pressure being satisfactory.

Representative particulate aluminum to which nonhalid titanium-containing organic compounds or activators or reaction promoters may be added according to the invention has the following particle-size breakdown (U.S. Sieve Series)..

| MESH | WEIGHT % |
| --- | --- |
| +12 | 0.0 |
| −12+40 | 11.8 |
| −40+100 | 26.6 |
| −100+200 | 18.6 |
| −200+325 | 13.6 |
| −325 | 29.4 |

When the titanium-containing organic compound is added during milling or grinding, for example, in a ball mill, a hydrocarbon solvent, for example, hexane, kerosene, benzene, mineral spirits or the like may be employed. DESCRIPTION OF THE PREFERRED EMBODIMENTS The following examples are illustrative of the invention.

EXAMPLE 1

1-octene was used as the starting alkyl-supplier reactant for reacting with commercial-grade atomized aluminum and hydrogen in an autoclave. Various titanium-containing compounds were tried as reaction promoters by adding them to a ball mill used for grinding the aluminum prior to conducting the alkylation reaction in the autoclave. At least one of the following four reactions is believed to have taken place in the autoclave.

I. $2Al + 3H_2 + 6C_8H_{16} \rightarrow 2(C_8H_{17})_3Al$
II. $2Al + 3H_2 + 4(C_8H_{17})_3Al \rightarrow 6(C_8H_{17})_2AlH$
III. $(C_8H_{17})_2AlH + C_8H_{16} \rightarrow (C_8H_{17})_3Al$
IV. $C_8H_{16} + H_2 \rightarrow C_8H_{18}$, where $C_8H_{16}$ = 1-octene, and $C_8H_{18}$ = n-octane Results of the alkylation (of aluminum) reaction are reported in Table I. The presence of dialkylaluminum hydride in the product indicates substantially complete consumption of the 1-octene reactant. The procedure employed in producing the data reported in Table I involved milling 20g (740 millimoles) of atomized powder in a benzene solution of triethylaluminum (TEA) and the promoter and transferring the milled powder to an autoclave, using one 1-octene rinse. Autoclave temperature was 120°C. Hydrogen gas (about 1.7 moles) was pressed in at 2,000 psi after temperature equilibrium was reached. The dissolved aluminum figures in the table are a good indication of the amount of hydrogenation which took place. Where the actual dissolved aluminum figures agree reasonably well with theoretical dissolution calculated from amount of hydrogen consumed, the hydrogenation reaction converting 1-octene to n-octane was considered relatively unimportant. Presence of dialkylaluminum hydride ($R_2AlH$) in the product indicates that olefin has been substantially completely consumed through reactions I, III, and IV hereinabove. The titanium dioxide, sodium titanate and titanium tetrachloride were used in this example for comparative purposes.

TABLE I

| Additive to Mill | | Total Reaction Time | Induction Period | Initial Rate | Dissolved Al | | % of Total Alkylaluminum Present As $R_2AlH$ |
| --- | --- | --- | --- | --- | --- | --- | --- |
| Compound | Amount | | | | Calc. From $H_2$ Consumed | Based On Al Recovered | |
| | mmoles | min. | min. | psi./sec. | % | % | % |
| $TiO_2$ | 7.5 | 90 | 0 | 0.11 | 59 | — | 0 |
| $Na_2Ti_3O_7$ | 2.7 | 90 | 0 | 0.31 | 78 | 73 | 0 |
| $Na_2Ti_3O_7$ | 0.2 | 120 | 0 | 0.17 | 86 | 60 | 0 |
| $TiCl_4$ | 0.6 | 100 | 0 | 1.23 | 107 | 86 | 0 |
| Tetraisopropyl titanate (DuPont Tyzor TPT) | 0.6 | 90 | 0 | 2.98 | 174 | 78 | 61 |
| Titanium glycolate (DuPont Tyzor OG) | 0.6 | 120 | 0 | 2.06 | 173 | 84 | 11 |

EXAMPLE 2

Reaction (1) hereinabove was conducted using 20 g. particulate aluminum (0.74 mole) containing 0.02 percent zinc milled in a benzene solution containing 0.04 mole TEA per mole aluminum, in addition to the titanium compounds indicated in Table II. Titanium tetrachloride and sodium titanate were included for comparative purposes. The resulting slurry was transferred after one 150-ml rinse to a 1-liter autoclave. 325 ml triethylaluminum (2.37 moles) were then added to the autoclave, which was heated to 120°C. 2,000 psi $H_2$ gas (about 1.7 moles) was pressed in after temperature equilibrium was reached. The reaction was followed by monitoring pressure drop. The autoclave was repressusred to 2,000 psi with $H_2$ gas as required. Results are summarized in Table II.

TABLE II

| Mill Additive | Titanium Concentration, moles/ mole Al | Induction Period | Initial Rate psi./sec. |
|---|---|---|---|
| TEA + titanium tetrachloride | 0.0008 | 0 | 3.5 |
| TEA + sodium titanate | 0.008 | 8 | 0.19 |
| TEA + tetraisopropyl titanate | 0.0008 | 0 | 4.1 |
| TEA + titanium glycolate | 0.0008 | 0 | 3.1 |

Zirconium octoate gives substantially equally as good results as the other compounds used according to the invention as promoters in the foregoing examples.

While the invention has been described in terms of preferred embodiments, the claims appended hereto are intended to encompass all embodiments which fall within the spirit of the invention.

Having thus described my invention and certain preferred thereof, I claim:

1. A process for promoting reactivity of particulate aluminum which comprises milling particulate aluminum in the presence of a reaction promoter selected from the group consisting of titanium glycolate and zirconium octoate.

2. The process of claim 1 wherein the particulate aluminum is atomized aluminum.

* * * * *